(12) United States Patent
Noda et al.

(10) Patent No.: US 8,042,857 B2
(45) Date of Patent: Oct. 25, 2011

(54) ROOF OPENING AND CLOSING APPARATUS FOR VEHICLE

(75) Inventors: Hiroyuki Noda, Anjo (JP); Katsura Inoue, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 281 days.

(21) Appl. No.: 12/508,147

(22) Filed: Jul. 23, 2009

(65) Prior Publication Data
US 2010/0019531 A1    Jan. 28, 2010

(30) Foreign Application Priority Data
Jul. 28, 2008    (JP) ................................ 2008-193115

(51) Int. Cl.
*B62D 25/10* (2006.01)
*B60J 7/20* (2006.01)
(52) U.S. Cl. ................. 296/107.08; 296/76; 296/136.05
(58) Field of Classification Search ..................... 296/76, 296/107.08, 107.01, 121, 122, 136.05, 136.06
See application file for complete search history.

(56) References Cited

U.S. PATENT DOCUMENTS

| | | | |
|---|---|---|---|
| 6,145,915 A * | 11/2000 | Queveau et al. | 296/107.08 |
| 6,364,396 B1 | 4/2002 | Hayashi et al. | |
| 6,511,118 B2 * | 1/2003 | Liedmeyer et al. | 296/107.17 |
| 6,663,163 B2 * | 12/2003 | Koch | 296/107.08 |
| 6,702,361 B2 * | 3/2004 | Russke | 296/107.08 |
| 6,824,194 B2 * | 11/2004 | Weissmueller et al. | 296/136.05 |
| 7,093,885 B2 * | 8/2006 | Guillez et al. | 296/107.08 |
| 7,419,200 B2 * | 9/2008 | Queveau et al. | 296/24.44 |
| 7,425,031 B2 * | 9/2008 | Habacker et al. | 296/107.08 |
| 7,686,377 B2 * | 3/2010 | Brockhoff | 296/107.08 |
| 7,690,717 B2 * | 4/2010 | Baumeier | 296/136.06 |
| 7,740,302 B2 * | 6/2010 | Heselhaus | 296/116 |
| 7,753,433 B2 * | 7/2010 | Baumeier | 296/136.05 |
| 7,758,100 B2 * | 7/2010 | Willard et al. | 296/107.08 |
| 7,819,459 B2 * | 10/2010 | Kinnanen et al. | 296/107.08 |

(Continued)

FOREIGN PATENT DOCUMENTS

DE    100 52 001 A1    5/2002

(Continued)

OTHER PUBLICATIONS

European Search Report issued Nov. 30, 2009 by the European Patent Office in European Patent Application No. 09009633.0.

*Primary Examiner* — Glenn Dayoan
*Assistant Examiner* — Gregory Blankenship
(74) *Attorney, Agent, or Firm* — Buchanan Ingersoll & Rooney PC

(57) ABSTRACT

A roof opening and closing apparatus for a vehicle includes a cover member opening and closing mechanism including a front side opening and closing mechanical unit, a rear side opening and closing mechanical unit, and an intermediate support unit connecting the front side opening and closing mechanical unit and the rear side opening and closing mechanical unit, a panel moving mechanism including a panel member and a panel movement mechanical unit, the panel member covering a portion of a vehicle body in a case where a roof is in a stored state, the portion of the vehicle body being positioned at a lower end of a rear corner portion of the roof when the roof is in a developed state, and the panel movement mechanical unit supporting the panel member to be moved to the storage compartment in a case where the roof is in the deployed state.

12 Claims, 5 Drawing Sheets

U.S. PATENT DOCUMENTS

| | | | |
|---|---|---|---|
| 7,857,374 B2 * | 12/2010 | Weismuller et al. | 296/124 |
| 7,862,099 B2 * | 1/2011 | Hayashi et al. | 296/107.08 |
| 7,900,992 B2 * | 3/2011 | Roeder | 296/107.08 |
| 2004/0017092 A1 * | 1/2004 | Antreich | 296/107.08 |
| 2004/0017093 A1 * | 1/2004 | Heller et al. | 296/136.06 |
| 2006/0001286 A1 * | 1/2006 | Queveau et al. | 296/37.1 |
| 2008/0197666 A1 * | 8/2008 | Brockhoff | 296/107.08 |
| 2010/0019531 A1 * | 1/2010 | Noda et al. | 296/107.07 |

FOREIGN PATENT DOCUMENTS

| | | |
|---|---|---|
| DE | 101 32 547 B4 | 3/2005 |
| JP | 2000-103288 A | 4/2000 |
| JP | 2001-113952 A | 4/2001 |
| WO | WO 2006/131100 A1 | 12/2006 |

* cited by examiner

ROOF OPENING AND CLOSING APPARATUS FOR VEHICLE

CROSS REFERENCE TO RELATED APPLICATIONS

This application is based on and claims priority under 35 U.S.C. §119 to Japanese Patent Application 2008-193115, filed on Jul. 28, 2008, the entire content of which is incorporated herein by reference.

FIELD OF THE INVENTION

The present invention relates to a roof opening and closing apparatus for a vehicle. More particularly, the present invention pertains to a roof opening and closing apparatus for a vehicle including a panel moving mechanism.

BACKGROUND

A known vehicle is equipped with a roof that is changeable between a deployed state where a vehicle interior space is covered and a stored state where a luggage room provided at a rear of the vehicle is used as a storage compartment of the roof.

The aforementioned vehicle includes pillar portions that are provided at both left and right sides of a rear window of the roof in a width direction of the vehicle and that extend in a vertical direction of the vehicle. In a case where the roof is in the stored state, a clearance originally covered by a lower end of the pillar portion and penetrating through the luggage room is covered by a panel member. That is, in a case where the roof is in the stored state, an improved appearance of the vehicle is ensured by the panel member. In order to return the roof from the stored state to the deployed state, a panel moving mechanism of a roof opening and closing apparatus for a vehicle is provided to store the panel member in the luggage room.

A mechanical unit of the aforementioned panel moving mechanism is attached to a vehicle body within the luggage room. When the roof is deployed or stored in the luggage room, the panel member is positioned within the luggage room in such a way that the panel member is prevented from interfering with the roof. After completion of the storage of the roof in the luggage room, the panel member is moved to a position where the pillar portion is provided when the roof is in the deployed state by means of an operation of the panel moving mechanism. Such panel moving mechanism is disclosed in DE10132547B4.

However, according to the panel moving mechanism disclosed in DE1013247B4, an area and a shape of the panel member is restricted so as to prevent the interference between the panel member and the roof within a limited space of the luggage room. As a result, an effect for ensuring the improved appearance of the vehicle may not be adequately achieved.

A need thus exists for a roof opening and closing apparatus for a vehicle which is not susceptible to the drawback mentioned above.

SUMMARY OF THE INVENTION

According to an aspect of the present invention, a roof opening and closing apparatus for a vehicle includes a cover member opening and closing mechanism adapted to be supported by a vehicle body and moving a cover member adapted to cover a roof when the roof is stored within a storage compartment provided at the vehicle body. The cover member opening and closing mechanism includes a front side opening and closing mechanical unit adapted to be connected to the vehicle body and moving a front portion of the cover member to a greater extent in a vertical direction of the vehicle than a rear portion of the cover member, a rear side opening and closing mechanical unit adapted to support the cover member and moving the rear portion of the cover member to a greater extent in the vertical direction of the vehicle than the front portion of the cover member, and an intermediate support unit connecting the front side opening and closing mechanical unit and the rear side opening and closing mechanical unit to each other. The roof opening and closing apparatus further includes a panel moving mechanism including a panel member and a panel movement mechanical unit, the panel member covering a portion of the vehicle body in a case where the roof is in a stored state where the roof is stored in the storage compartment, the portion of the vehicle body being positioned at a lower end of a rear corner portion of the roof when the roof is in a developed state where the roof covers a vehicle interior space of the vehicle, and the panel movement mechanical unit supported by the intermediate support unit and supporting the panel member to be moved to the storage compartment in a case where the roof is in the deployed state.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

An embodiment of the present invention will be explained with reference to the attached drawings.

Figure 1:
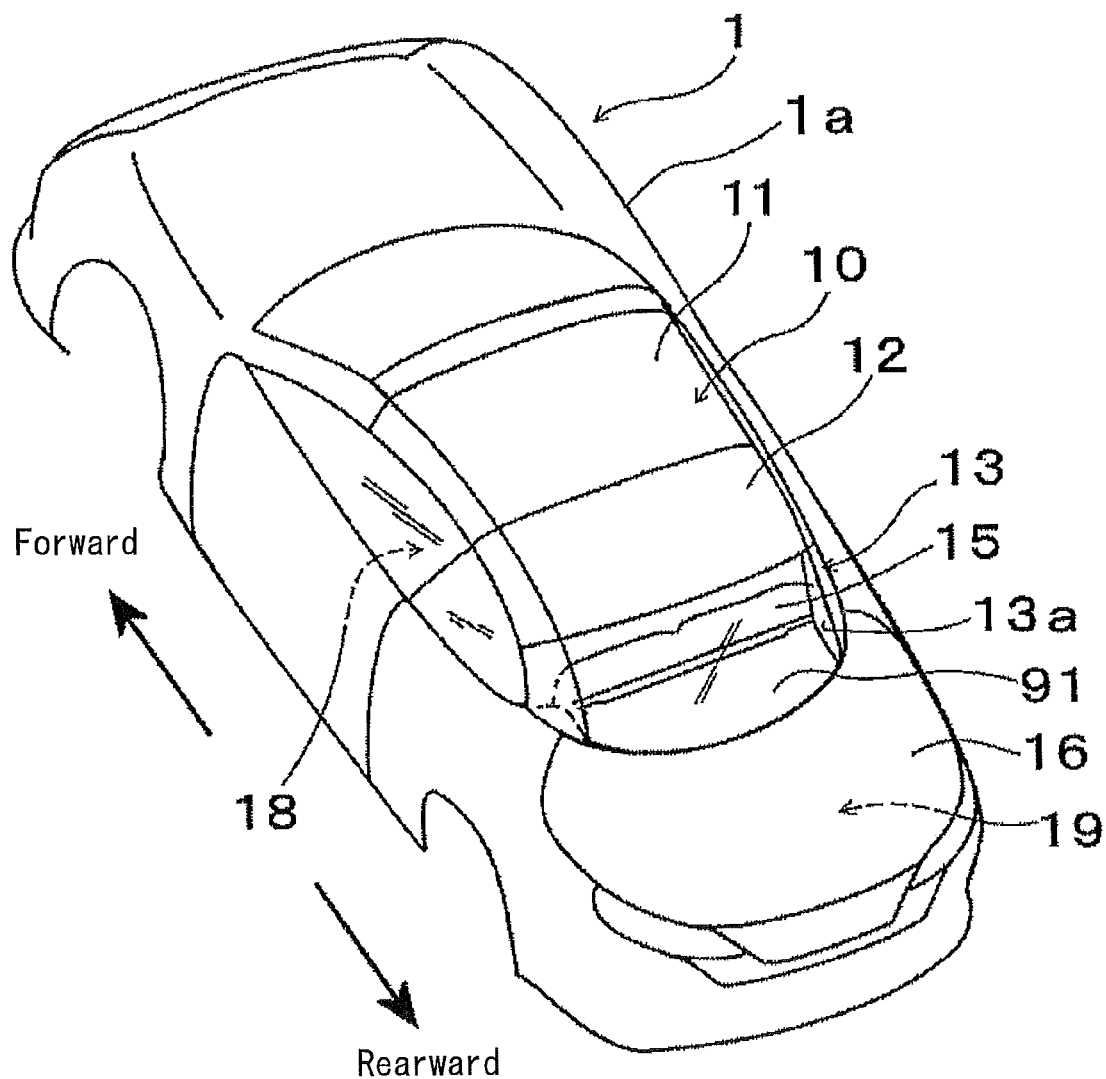
FIG. 1 is a perspective view of a vehicle equipped with a roof opening and closing apparatus for a vehicle when viewed from a rear upper side of the vehicle according to an embodiment of the present invention.

A roof opening and closing apparatus for a vehicle according to the embodiment includes a cover member opening and closing mechanism 5, a roof opening and closing mechanism 3, a panel moving mechanism 70, and the like. In the embodiment, two cover member opening and closing mechanisms 5, two roof opening and closing mechanisms 3, and two panel moving mechanisms 70 are symmetrically provided at right and left sides of a vehicle 1 (i.e., both sides in a width direction of the vehicle 1). In the following, unless otherwise specified, the cover member opening and closing mechanism 5, the roof opening and closing mechanism 3, and the panel moving mechanism 70 provided at one of the right and left sides of the vehicle 1 will be explained as an example. As illustrated in FIG. 1, the vehicle 1 includes a movable roof 10, herein referred to as a roof 10. The roof 10 of the vehicle 1 is changeable between a deployed state and a stored state.

The roof 10 illustrated in FIG. 1 is in the deployed state. The roof 10 is constituted by a front portion 11, an intermediate portion 12, and a rear portion 13 arranged in this order from a front to a rear of the vehicle 1 so as to cover a vehicle interior space 18. A rear window 15 and pillar portions 13a (rear corner portions) are provided at the rear portion 13. The pillar portions 13a are provided at both left and right sides of the rear window 15 in the width direction so as to extend in a vertical direction of the vehicle 1.

Further, as illustrated in FIG. 1, the vehicle 1 includes a storage compartment 19 at a rear, which is generally used as a luggage room. A cover member 16 that can be opened and closed is attached to the storage compartment 19.

Figure 2A:
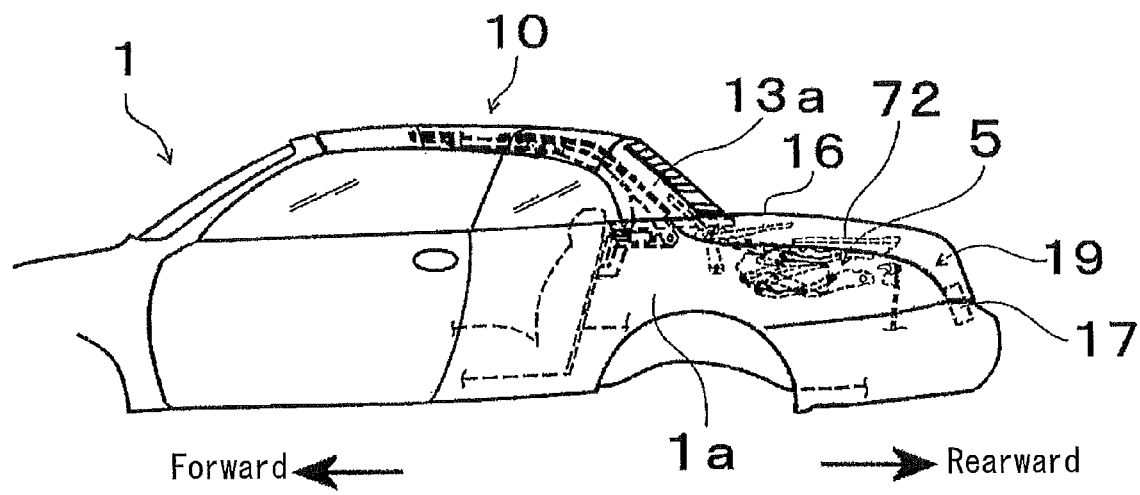
FIG. 2A is a side view of the vehicle equipped with the roof opening and closing apparatus in a case where a roof of the vehicle is in a deployed state.
Figure 2B:
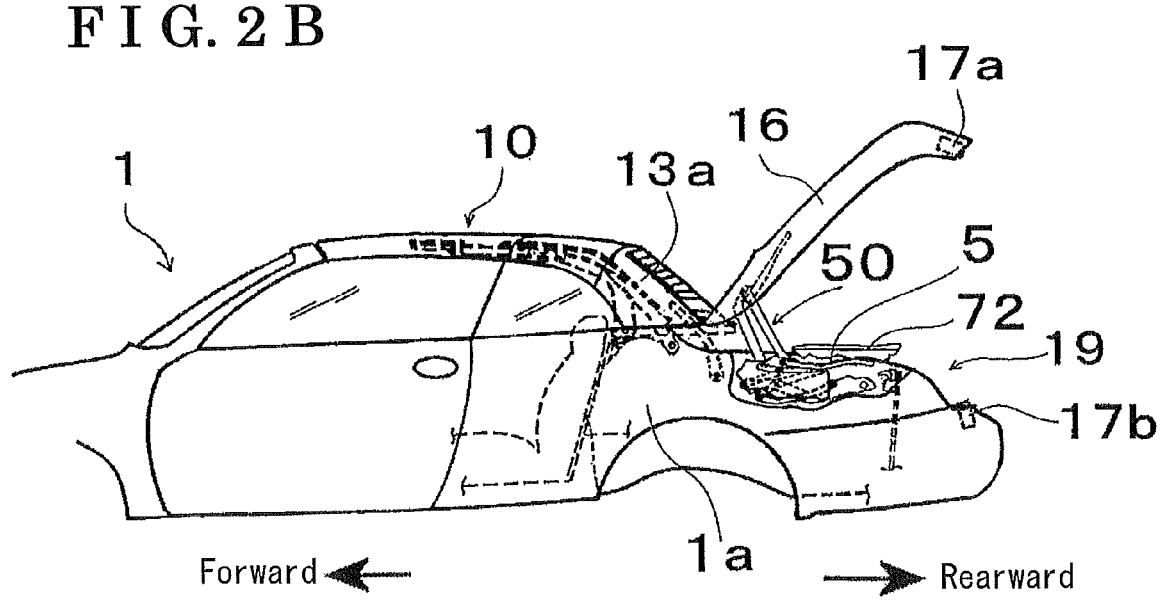
FIG. 2B is a side view of the vehicle equipped with the roof opening and closing apparatus in a case where a storage compartment is opened.

FIG. 2A is a side view of the vehicle 1 illustrating the cover member 16 in a closed state. FIG. 2B is a side view of the vehicle 1 illustrating the cover member 16 of which rear end is lifted up so that luggage can be taken in or out of the storage compartment 19. A lock device 17 is attached to a rear end portion of the cover member 16 for causing the cover member 16 to engage with a vehicle body 1a.

As illustrated in FIGS. 2A and 2B, the cover member opening and closing mechanism 5 is provided within the storage compartment 19, being supported by the vehicle body 1a. The cover member opening and closing mechanism 5 includes a rear side opening and closing mechanical unit 50 for opening and closing the cover member 16 in such a way that a rear portion of the cover member 16 is moved to a greater extent in a substantially vertical direction of the vehicle than a front portion of the cover member 16. The lock device 17 includes a lock main body 17a attached to the cover member 16 and a lock catcher 17b attached to the vehicle body 1a. The engagement between the lock main body 17a and the lock catcher 17b is released and thereafter the cover member 16 is opened and closed by means of the rear side opening and closing mechanical unit 50.

Figure 3A:
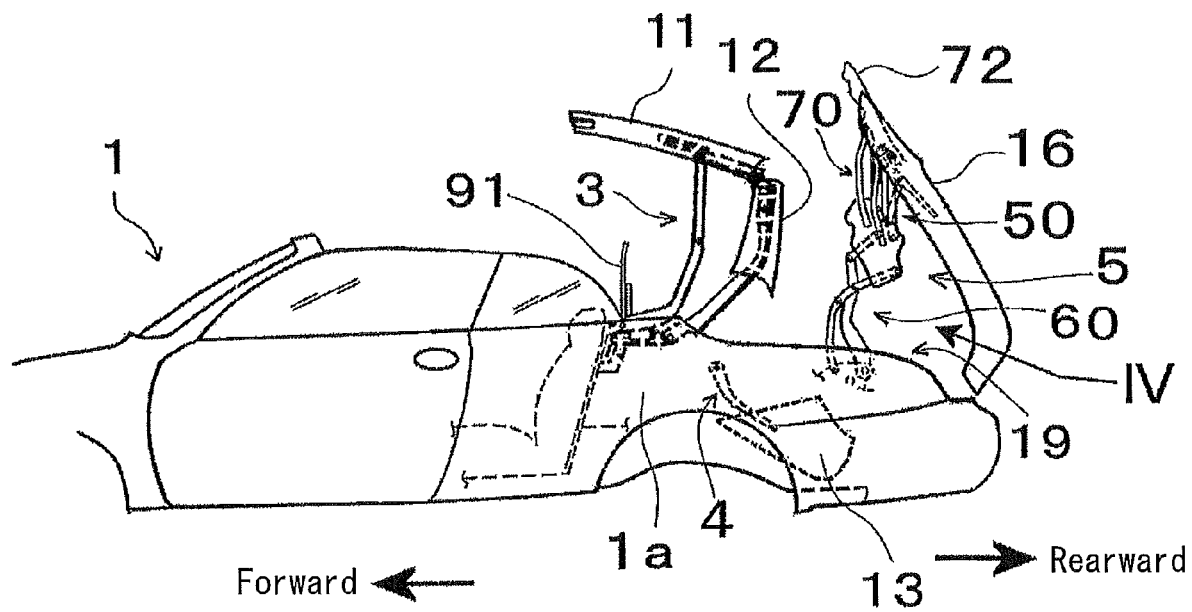
FIG. 3A is a side view of the vehicle equipped with the roof opening and closing apparatus in a case where the roof is in a process of being stored from the deployed state.

The roof opening and closing mechanism 3 moves the front portion 11 and the intermediate portion 12, and a rear roof opening and closing apparatus 4 for moving the rear portion 13. As illustrated in FIG. 3A, the cover member opening and closing mechanism 5 includes a front side opening and closing mechanical unit 60 for lifting up the front portion of the cover member 16 so as to open the cover member 16 when the roof 10 is moved.

Figure 4:
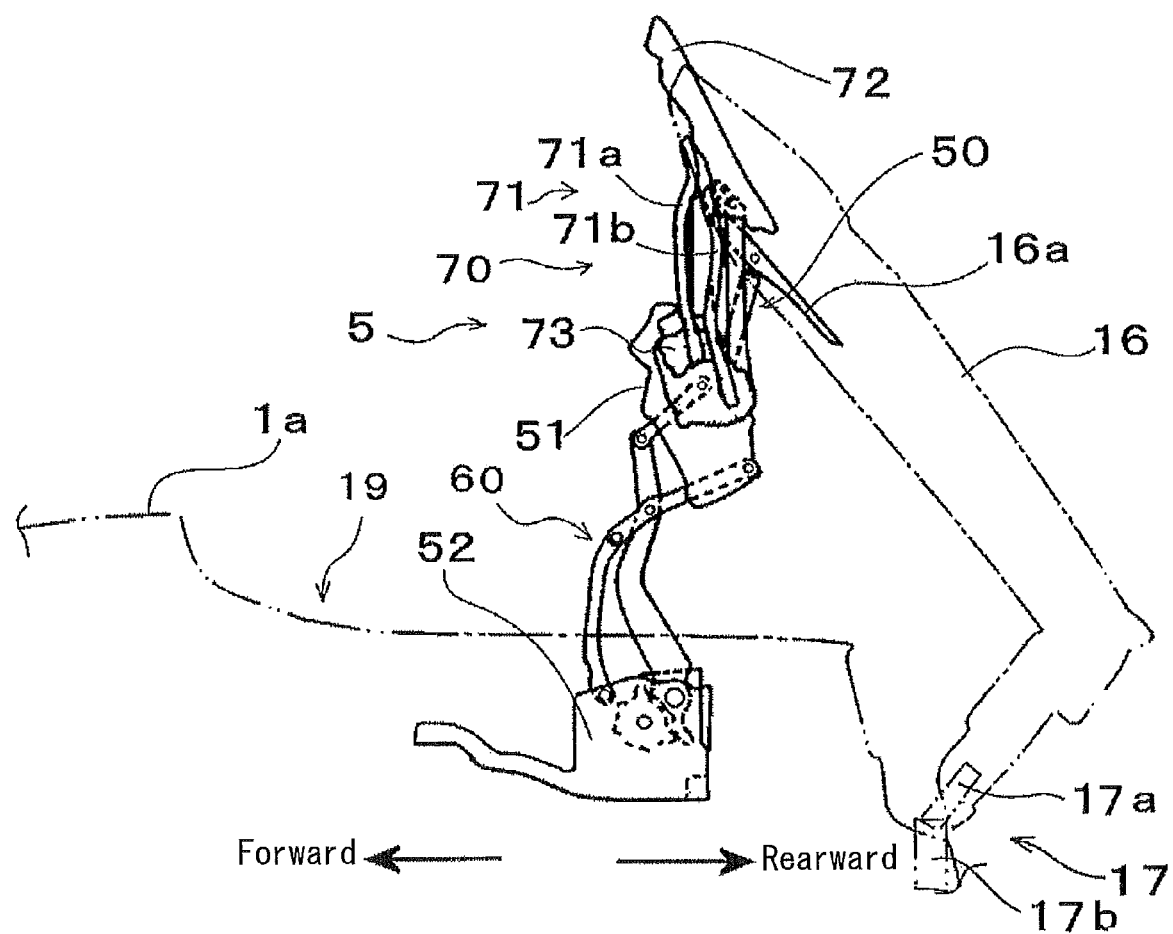
FIG. 4 is an enlarged view of a portion IV shown in FIG. 3A.

As illustrated in FIG. 4, the cover member opening and closing mechanism 5 includes a cover member drive unit 52 attached to the vehicle body 1a within the storage compartment 19. A lower end of the front side opening and closing mechanical unit 60 including multiple link members is connected to the cover member drive unit 52. An upper end of the front side opening and closing mechanical unit 60 is connected to an intermediate support unit 51, which is connected to a lower end of the rear side opening and closing mechanical unit 50. An upper end of the rear side opening and closing mechanical unit 50 is connected to a bracket 16a, which is fixed to a front edge of the cover member 16, so as to support the cover member 16.

Further, as illustrated in FIG. 4, the panel moving mechanism 70 is attached to the intermediate support unit 51. The panel moving mechanism 70 includes a drive unit 73, a panel movement mechanical unit 71, and a panel member 72. The drive unit 73, which is fixed to the intermediate support unit 51, includes an electric motor serving as a driving source for moving the panel member 72. The panel movement mechanical unit 71 includes a parallel linkage constituted by two link arms 71a and 71b. One end of the link arm 71a is rotatably supported by the drive unit 73 about a pivot while the other end of the link arm 71a extends towards the cover member 16. In the same way, one end of the link arm 71b is rotatably supported by the drive unit 73 about a pivot while the other end of the like arm 71b extends towards the cover member 16. Both other ends of the link arms 71a and 71b are rotatably connected to the panel member 72 about the respective pivots so that the panel movement mechanical unit 71 supports the panel member 72 to be movable.

Figure 3B:
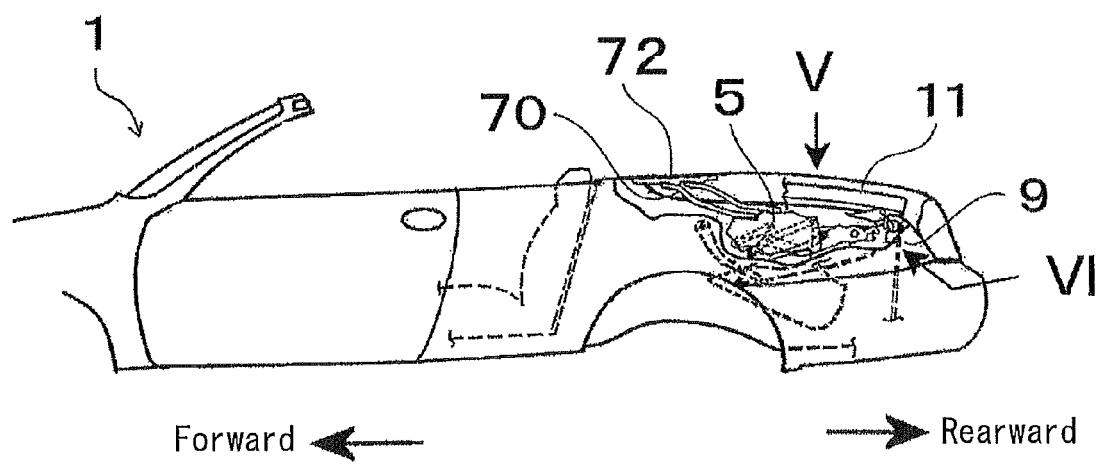
FIG. 3B is a side view of the vehicle equipped with the roof opening and closing apparatus in a case where the roof is completely stored.
Figure 5:
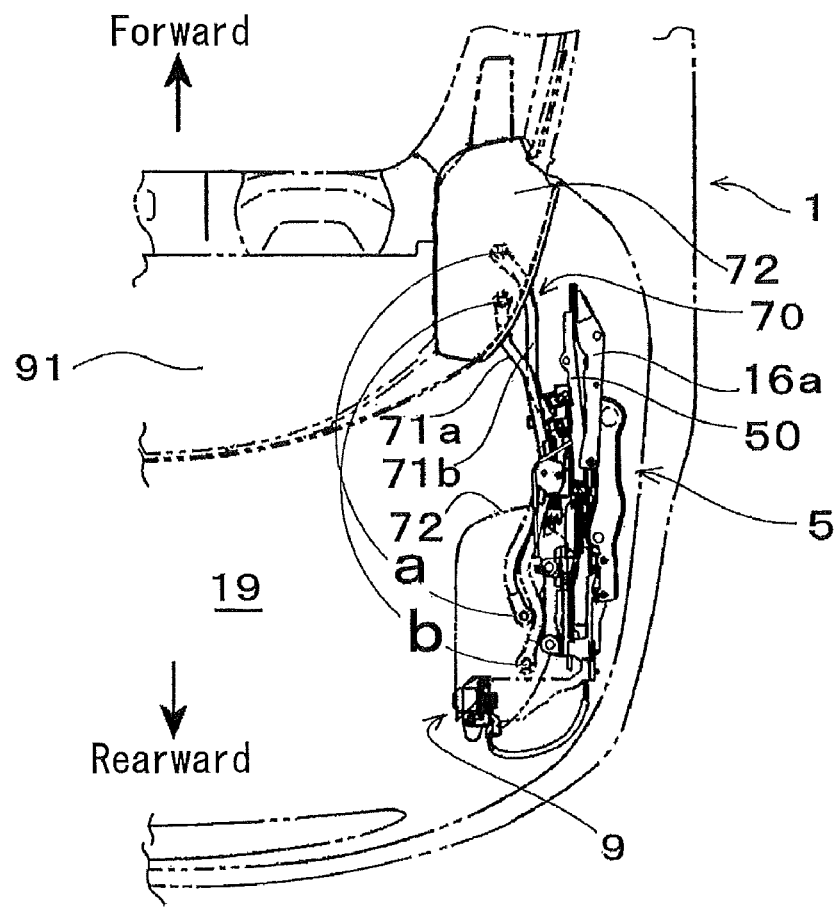
FIG. 5 is a view on arrow V shown in FIG. 3B.

FIG. 5 is a diagram of the vehicle 1 when viewed from a direction V in FIG. 3B. In a case where the roof 10 is in the stored state, the panel member 72 covers a portion of the vehicle body 1a that is positioned in the vicinity of a lower end of the pillar portion 13a provided at the rear window 15 when the roof 10 is in the deployed state. The panel member 72 and a center panel 91 that is positioned between the panel members 72 provided at both left and right sides of the vehicle 1 in the width direction assures the improved appearance of the vehicle 1 by covering an upper portion of the storage compartment 19. As illustrated in FIG. 3A, the center panel 91 vertically extends when the roof 10 moves and the panel member 72 moves upward together with the cover member 16 so that the panel member 72 is operated not to interfere with the movement of the roof 10.

In a case where the roof 10 is in the deployed state as illustrated in FIG. 2A or 2B, the panel member 72 is positioned as illustrated by a chain double-dashed line in FIG. 5. When the panel member 72 moves between the position illustrated by a solid line and the position illustrated by the chain double-dashed line in FIG. 5, the link arm 71a rotates by following a locus "a" while the link arm 71b rotates by following a locus "b". That is, the parallel linkage by the link arms 71a and 71b, which rotate while having a predetermined distance therebetween, assures each position of the panel member 72 while the panel member 72 is moving.

The panel member 72 moves from the position illustrated by the solid line to the position illustrated by the chain double-dashed line in FIG. 5 when the roof 10 is in a process of being deployed. The panel member 72 moves from the position illustrated by the chain double-dashed line to the position illustrated by the solid line when the roof 10 is in a process of being stored in the storage compartment 19 as illustrated in FIG. 3A.

Figure 6:
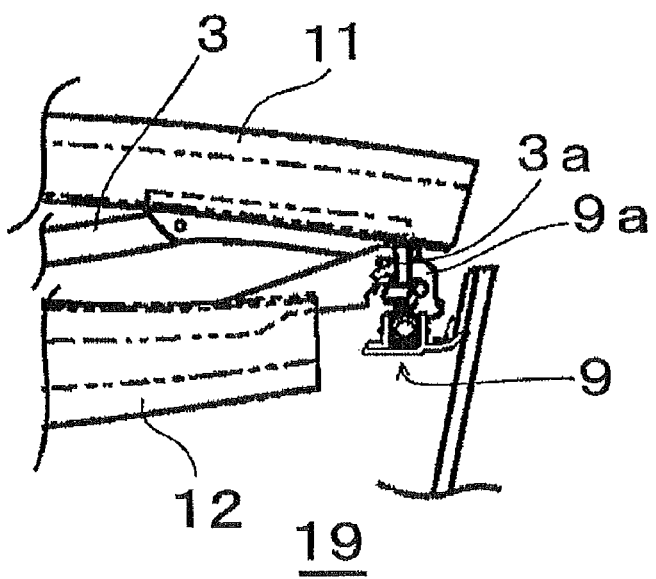
FIG. 6 is an enlarged view of a portion VI shown in FIG. 3B.

As illustrated in FIG. 6, a striker 3a is attached to the roof opening and closing mechanism 3 accommodated in the storage compartment 19. An engagement mechanism 9 including a hook 9a engageable with the striker 3a is provided within the storage compartment 19. When the panel member 72 is arranged in the position as illustrated by the chain double-dashed line in FIG. 5, the panel member 72 is configured to cover an upper portion of the engagement mechanism 9 (i.e., a portion of the vehicle body 1a). Accordingly, in a case where the rear portion of the cover member 16 is lifted up so that luggage can be taken in or out of the storage compartment 19, the luggage is prevented from interfering with the engagement mechanism 9. In addition, covering the engagement mechanism 9 improves the appearance of the vehicle.

The roof 10 having the aforementioned structure is shifted between the deployed state and the stored state based on a control program included in a roof control unit provided at the vehicle 1 so that the related members and portions are controlled and interlocked.

According to the aforementioned embodiment, the panel member 72, in addition to the panel movement mechanical unit 71 and the drive unit 73 attached to the intermediate support unit 51 of the cover member opening and closing mechanism 5 and the cover member 16, is lifted up to a position where the panel member 72 is prevented from interfering with the roof 10. Thus, a size and a shape of the panel member 72 in view of a flat face are not likely to be restricted by a space (i.e., a limited space) within the storage compartment 19. Thus, flexibility of design in view of ensuring the improved appearance of the vehicle 1 of which the vehicle 10 is in the stored state is improved, thereby contributing to a design enhancement of the vehicle's appearance.

According to the aforementioned embodiment, the panel moving mechanism 70 is attached to the intermediate support unit 51 of the cover member opening and closing mechanism 5. Thus, while the roof is moving, the panel member 72 is lifted up together with the cover member 16 to a position where the panel member 72 is prevented from interfering with the roof 10. Accordingly, the panel member 72 is unlikely to be restricted by a space within the storage compartment 19. An area and a shape of the panel member 72 are flexibly determined accordingly. Thus, flexibility of design in view of ensuring the improved appearance of the vehicle 1 of which the roof 10 is in the stored state is improved, thereby contributing to a design enhancement of the vehicle's appearance.

Further, the roof opening and closing apparatus includes the engagement mechanism 9 adapted to be connected to the vehicle body 1a within the storage compartment 19 and locking the roof 10 in the storage state, wherein the panel member 72 is arranged above the engagement mechanism 9 in the storage state of the roof 10.

According to the aforementioned embodiment, in a case where the roof 10 is in the deployed state, the storage compartment 19 is used for accommodating luggage. The engagement mechanism 9 is provided within the storage compartment 19 for locking the roof 10. The panel member 72 is arranged at an upper portion of the engagement mechanism 9 within the storage compartment 19 to thereby prevent the interference between luggage and the engagement mechanism 9 when luggage is taken in or out of the storage compartment 19 and to ensure the appearance of the vehicle 1.

The panel movement mechanical unit 71 includes a parallel linkage constituted by the two link arms 71a and 71b rotating while having a predetermined distance therebetween.

According to the aforementioned embodiment, the parallel linkage ensures each position of the panel member 72 while the panel member 72 is moving. As a result, the panel member 72 is appropriately and precisely arranged at a predetermined position where the improved vehicle appearance is assured. In addition, the panel member 72 is prevented from making contact with a portion of the vehicle body 10a caused by a vibration during a driving of the vehicle, and the like.

The panel member 72 and the cover member 16 are moved to be positioned at an upper side of the storage compartment 19 when the roof 10 is changed between the deployed state and the stored state.

The roof opening and closing apparatus further includes the roof opening and closing mechanism 3, 4 adapted to support the roof 10 to be movable, wherein the roof 10 includes the front portion 11, 12 and the rear portion 13 that is arranged at a rear of the vehicle 1 relative to the front portion 11, 12, the rear portion 13 including the rear window 15 and the pillar portions 13a provided at both right and left sides of the rear window 15 in the width direction of the vehicle 1.

The panel member 72 is arranged at each side of the vehicle 1 in the width direction, and the center panel 91 adapted to be supported by the vehicle body 1a is arranged between the panel members 72.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof opening and closing apparatus for a vehicle, comprising:
a cover member opening and closing mechanism adapted to be supported by a vehicle body and moving a cover member adapted to cover a roof when the roof is stored within a storage compartment provided at the vehicle body;
the cover member opening and closing mechanism including a front side opening and closing mechanical unit adapted to be connected to the vehicle body and moving a front portion of the cover member to a greater extent in a vertical direction of the vehicle than a rear portion of the cover member, a rear side opening and closing mechanical unit adapted to support the cover member and moving the rear portion of the cover member to a greater extent in the vertical direction of the vehicle than the front portion of the cover member, and an intermediate support unit connecting the front side opening and closing mechanical unit and the rear side opening and closing mechanical unit to each other;
a panel moving mechanism including a panel member and a panel movement mechanical unit;
the panel member covering a portion of the vehicle body in a case where the roof is in a stored state where the roof is stored in the storage compartment, the portion of the vehicle body being positioned at a lower end of a rear corner portion of the roof when the roof is in a developed state where the roof covers a vehicle interior space of the vehicle; and
the panel movement mechanical unit supported by the intermediate support unit and supporting the panel member to be moved to the storage compartment in a case where the roof is in the deployed state.

2. The roof opening and closing apparatus according to claim 1, further comprising an engagement mechanical unit adapted to be connected to the vehicle body within the storage compartment and locking the roof in the storage state, wherein the panel member is arranged above the engagement mechanical unit in the storage state of the roof.

3. The roof opening and closing apparatus according to claim 1, wherein the panel movement mechanical unit includes a parallel linkage constituted by first and second link arms rotating while having a predetermined distance therebetween.

4. The roof opening and closing apparatus according to claim 2, wherein the panel member and the cover member are moved to be positioned at an upper side of the storage compartment when the roof is changed between the deployed state and the stored state.

5. The roof opening and closing apparatus according to claim 1, further comprising a roof opening and closing mechanism adapted to support the roof to be movable, wherein the roof includes a front portion and a rear portion that is arranged at a rear of the vehicle relative to the front portion, the rear portion including a rear window and the rear corner portions provided at both right and left sides of the rear window in a width direction of the vehicle.

6. The roof opening and closing apparatus according to claim 2, further comprising a roof opening and closing mechanism adapted to support the roof to be movable, wherein the roof includes a front portion and a rear portion that is arranged at a rear of the vehicle relative to the front portion, the rear portion including a rear window and the rear corner portions provided at both right and left sides of the rear window in a width direction of the vehicle.

7. The roof opening and closing apparatus according to claim 3, further comprising a roof opening and closing mechanism adapted to support the roof to be movable, wherein the roof includes a front portion and a rear portion that is arranged at a rear of the vehicle relative to the front portion, the rear portion including a rear window and the rear corner portions provided at both right and left sides of the rear window in a width direction of the vehicle.

8. The roof opening and closing apparatus according to claim 4, further comprising a roof opening and closing mechanism adapted to support the roof to be movable, wherein the roof includes a front portion and a rear portion that is arranged at a rear of the vehicle relative to the front portion, the rear portion including a rear window and the rear corner portions provided at both right and left sides of the rear window in a width direction of the vehicle.

9. The roof opening and closing apparatus according to claim 5, wherein the panel member is arranged at each side of the vehicle in the width direction, and a center panel adapted to be supported by the vehicle body is arranged between the panel members.

10. The roof opening and closing apparatus according to claim 6, wherein the panel member is arranged at each side of the vehicle in the width direction, and a center panel adapted to be supported by the vehicle body is arranged between the panel members.

11. The roof opening and closing apparatus according to claim 7, wherein the panel member is arranged at each side of the vehicle in the width direction, and a center panel adapted to be supported by the vehicle body is arranged between the panel members.

12. The roof opening and closing apparatus according to claim 8, wherein the panel member is arranged at each side of the vehicle in the width direction, and a center panel adapted to be supported by the vehicle body is arranged between the panel members.

\* \* \* \* \*